(12) United States Patent
Visoz et al.

(10) Patent No.: US 10,313,052 B2
(45) Date of Patent: Jun. 4, 2019

(54) METHOD AND DEVICE FOR FLEXIBLE, SELECTIVE SSDF RELAYING

(71) Applicant: Orange, Paris (FR)

(72) Inventors: Raphael Visoz, Vanves (FR); Abdulaziz Mohamad, Gif sur Yvette (FR); Antoine Berthet, Chatenay Malabry (FR)

(73) Assignee: ORANGE, Paris (FR)

( * ) Notice: Subject to any disclaimer, the term of this patent is extended or adjusted under 35 U.S.C. 154(b) by 185 days.

(21) Appl. No.: 15/527,559

(22) PCT Filed: Nov. 30, 2015

(86) PCT No.: PCT/FR2015/053262
§ 371 (c)(1),
(2) Date: May 17, 2017

(87) PCT Pub. No.: WO2016/083764
PCT Pub. Date: Jun. 2, 2016

(65) Prior Publication Data
US 2017/0331584 A1 Nov. 16, 2017

(30) Foreign Application Priority Data
Nov. 28, 2014 (FR) ..................... 14 61661

(51) Int. Cl.
*H04L 1/00* (2006.01)
*H04B 7/155* (2006.01)
*H04M 13/00* (2006.01)

(52) U.S. Cl.
CPC ............ *H04L 1/004* (2013.01); *H04L 1/0048* (2013.01); *H04L 1/0076* (2013.01);
(Continued)

(58) Field of Classification Search
CPC ....... H04L 1/004; H04L 1/005; H04L 1/0048; H04L 1/0076; H04L 1/0068; H04L 27/2647; H04L 25/03242; H04B 7/15528
See application file for complete search history.

(56) References Cited

U.S. PATENT DOCUMENTS

| 2005/0111599 A1* | 5/2005 | Walton ............... H04B 1/71072 375/347 |
| 2013/0250776 A1 | 9/2013 | Hatefi et al. |

(Continued)

FOREIGN PATENT DOCUMENTS

| WO | 2010092437 A1 | 8/2010 |
| WO | 2011116831 A1 | 9/2011 |

(Continued)

OTHER PUBLICATIONS

International Search Report dated Feb. 2, 2016 for corresponding International Application No. PCT/FR2015/053262, filed Nov. 30, 2015.

(Continued)

*Primary Examiner* — Redentor Pasia
*Assistant Examiner* — Peter K Mak
(74) *Attorney, Agent, or Firm* — David D. Brush; Westman, Champlin & Koehler, P.A

(57) ABSTRACT

A method and relay for relaying messages. The relay includes tests reliability relating solely to messages estimated with error and taken in their form prior to error detection in order to be able to separate messages that are reliable and messages that are not reliable. The relay also includes a shaper unit having a channel interleaver and a modulator taking account only of the messages estimated without error and of those messages estimated with error (Continued)

that are reliable, this shaping being performed in soft form if at least one message estimated with error successfully passes the reliability test.

13 Claims, 5 Drawing Sheets

(52) U.S. Cl.
CPC ........ *H04B 7/15528* (2013.01); *H04L 1/0068* (2013.01); *H04M 13/00* (2013.01)

(56) References Cited

U.S. PATENT DOCUMENTS

| | | | |
|---|---|---|---|
| 2015/0067454 A1 | 3/2015 | Benammar et al. | |
| 2015/0124694 A1 | 5/2015 | Benammar et al. | |
| 2015/0200688 A1* | 7/2015 | Pan | H03M 13/3927 714/794 |
| 2016/0350000 A1* | 12/2016 | Ordentlich | G06F 12/0238 |

FOREIGN PATENT DOCUMENTS

| | | | |
|---|---|---|---|
| WO | 2012022905 A1 | 2/2012 | |
| WO | 2013093359 A1 | 6/2013 | |
| WO | 2013093361 A1 | 6/2013 | |
| WO | WO-2013093361 A1 * | 6/2013 | ........... H04L 1/0076 |

OTHER PUBLICATIONS

Written Opinion of the International Searching Authority dated Feb. 2, 2016 for corresponding International Application No. PCT/FR2015/053262, filed Nov. 30, 2015.

French Search Report and Written Opinion dated Jul. 22, 2015 for corresponding French Application No. 1461661, filed Nov. 28, 2014.

Atoosa Hatefi et al., "Full Diversity Distributed Coding for the Multiple Access Half-Duplex Relay Channel", Network Coding (Netcod), 2011 International Symposium on, IEEE, Jul. 25, 2011 (Jul. 25, 2011), pp. 1-6, XP031928315.

Yan-Xiu Zheng et al., "A Turbo Coding System for High Speed Communications", IEEE Transactions on Wireless Communications, IEEE Service Center, Piscataway, NJ, US, vol. 6, No. 10, Oct. 1, 2007 (Oct. 1, 2007), pp. 3700-3711, XP011194416.

English translation of the International Written Opinion of the International Searching Authority dated May 5, 2017, for corresponding International Application No. PCT/FR2015/053262, filed Nov. 30, 2015.

* cited by examiner

METHOD AND DEVICE FOR FLEXIBLE, SELECTIVE SSDF RELAYING

CROSS-REFERENCE TO RELATED APPLICATIONS

This Application is a Section 371 National Stage Application of International Application No. PCT/FR2015/053262, filed Nov. 30, 2015, which is incorporated by reference in its entirety and published as WO 2016/083764 A1 on Jun. 2, 2016, not in English.

FIELD OF THE INVENTION

The present invention relates to the field of telecommunications. Within this field, the invention relates more particularly to transmitting coded data between a source and a destination with relaying via a relay. The transmission system thus comprises at least three nodes. The invention relates equally well to systems having a plurality of relays between a source and a destination, to systems having a plurality of sources, a plurality of relays, and one or more destinations and to systems having one source, a plurality of relays, and a plurality of destinations.

The invention relates to network coding. It relates to improving the quality with which data is transmitted, and in particular to improving the performance of error-correcting decoding at the destination, by increasing the effectiveness of the relaying.

The invention relates particularly, but not exclusively, to transmitting data via mobile networks, e.g. for real-time applications or via networks of sensors.

PRIOR ART

The volume of wireless communications has been increasing rapidly for several years and it is expected that this progress will continue in the years to come. To accommodate this explosion, solutions consist in densifying the network, in managing interference (multiple antennas), or in adding spectrum.

Densifying the network requires deploying infrastructures that represent very significant cost. Given that user terminals (vehicles, smart phones, etc.) have ever-increasing functionality, they are becoming an alternative to deploying expensive infrastructure elements in order to densify the network. By their very nature, the connections accompanying this densification are wireless connections, and the transmissions they perform in their role of infrastructure elements are in competition with communications handled by the network, since they make use of the same spectrum resources. Nevertheless, the use of user terminals and network densification elements makes it necessary to process the associated interference.

The selective decode and forward (SDF) relaying technique is described in [1] [2] for a structure based on a multiple access and multiple relay channel (MAMRC) with links that are semi-orthogonal or non-orthogonal. Communications implemented by the MAMRC structure are said to be cooperative, with a plurality of sources transmitting simultaneously to a destination via one or more relays. The described technique is combined with full diversity network coding. The semi-orthogonal protocol enables the sources transmit simultaneously while using the same channel use during the stage in which the relay is listening, and then allows the relay to transmit alone during a stage in which the sources are silent. In the SDF relaying technique, the relay attempts to decode the messages from the sources and takes a hard decision about the messages that have been decoded correctly in the form of verifying the CRCs inserted in the messages. After network coding, the relay forwards to the destination only those messages that have been decoded correctly.

The hard decision may be taken on the basis of soft values (log likelihood ratios (LLRs)). When a plurality of sources transmit simultaneously, the relay performs iterative multi user joint decoding. At the last iteration, the detector associates LLR values with the bits of the messages from the sources. The LLR value associated with a bit b is the logarithm of the ratio between the probability of that bit b being equal to one and the probability of that bit b being equal to zero. The hard decision amounts to testing the sign of the LLR; if it is positive then the decision is that the bit b is one, and if it is negative, the decision is that the bit b is zero. It should be observed that an LLR value may be associated with a known bit, i.e. after a hard decision: by definition, the LLR of a one bit has a value of +infinity, and the LLR of a zero bit has the value of −infinity. In practice, infinity corresponds to the highest quantification value of the LLR.

Network coding is a form of cooperation in which the nodes of the network share not only their own resources (power, bandwidth, etc.) but also their computation capacity, in order to create a distributed code that becomes more and more powerful as the information propagates through the nodes. It gives rise to substantial improvement in terms of diversity and of encoding, and thus in terms of transmission reliability.

Main Characteristics of the Invention

The invention provides a method for relaying messages by a relay that delivers additional gain compared with known methods of relaying with selection. The relay is for a telecommunications system having M sources, L relays, and D destinations, with transmissions between the sources, the relays, and the destinations taking place via a transmission channel. $M \geq 1$, $L \geq 1$, $D \geq 1$. The method comprises:
  soft decoding of code words transmitted by at least one source during a given first number of the channel uses in order to obtain vectors of soft values representing the decoded messages;
  detecting errors in the vectors in order to be able to separate messages estimated without error from messages estimated with error;
  reliability testing relating solely to the vectors of messages estimated with error in order to be able to separate messages that are reliable from messages that are not reliable;
  shaping, comprising channel interleaving and modulation taking account only of the messages estimated without error and of those messages estimated with error that are reliable, this shaping being performed in soft form if at least one message estimated with error successfully passes the reliability testing; and
  during a second given number of channel uses, transmitting a signal that is representative of the messages taken into account by the shaping.

The soft selective decode and forward (SSDF) method of the invention can be used equally well in contexts of orthogonal links, of semi-orthogonal links, and of non-orthogonal links between the sources, relays, and the destinations. For example, in the context of a system based on a "two-way relay channel" (TRC) architecture, channel uses are subdivided in time into two stages: one stage corresponding to the sources transmitting, and another stage corresponding to the relay transmitting. When the links are non-orthogonal, the sources and the relays transmit simultaneously over the same spectrum resource; when the links are orthogonal, the sources and the relays share channel uses during their respective transmission stages; and when the links are semi-orthogonal, either the sources transmit simultaneously over the same spectrum resource, or the relays transmit simultaneously over the same spectrum resource. The number of channel uses to be shared between the M sources is written Cu (where channel use constitutes time-frequency granularity). If the protocol is orthogonal, then each source makes use of Cu/M uses of the channel, while if the protocol is non-orthogonal or semi-orthogonal, each source makes use of the Cu channel uses. For each relay, the relay detects and decodes in soft manner the code words transmitted by a source or transmitted respectively by M sources during the Cu or Cu/M channel uses. It performs error detection on the vectors of soft values representing the decoded messages, thus making it possible to separate messages that have been estimated without error from messages that have been estimated with error. It performs reliability testing relating solely to the vectors of messages estimated with error in order to be able to separate messages that are reliable from messages that are not reliable. This test is applied to the messages in their form prior to error detection, i.e. their form after soft decoding. When there is at least one message that has been estimated with error and that is reliable, shaping is performed in a soft form, i.e. it is applied to the soft values of the messages. The relay transmits the signal after modulation. In conventional mechanisms, a signaling signal informs the destination about the messages that have been taken into account in the shaping.

Testing the reliability of the vectors of the messages decoded with error makes it possible to discard messages that are too erroneous, and to conserve only the others. It should thus be understood that when a message is said to be reliable, without further details, it is implied that it was estimated with error and that it has successfully passed the reliability test. The soft values of reliable messages convey pertinent information that can be used effectively at the destination for correctly decoding the sources, even though the integrity of the message is not conserved during transmission over the channel.

Thus, the destination can benefit from gain due to network coding, even in the absence of messages decoded without error at the relay. The relaying of the invention thus increases the probability of successful decoding at the destination, while guaranteeing a degree of reliability for transmissions between the sources and the destination and minimizing the propagation of errors from the relays to the destination. Such a method is thus particularly suitable for a system deployed in a built-up area where the transmission channel generally suffers from so-called Rayleigh fading. Specifically, such fading disturbs the transmitted signal and gives rise to non-zero probability of erroneous detection, i.e. non-zero probability of an outage. An advanced selective relaying method of the invention advantageously makes it possible to limit the propagation of messages received erroneously, while still allowing information to be transmitted when an erroneous message has some degree of reliability. The method thus transmits information to the destination that is additional in comparison with known systems, thereby improving the probability of the destination detecting and decoding, more particularly when the source-to-relay links are noisy. Unlike certain relays, a relay of the invention remains silent when no message is without error and no erroneous message is reliable. This avoids the transmission of noise that would increase interference at the destination. Such an increase of interference is particularly harmful at the destination when the source-to-relay and the relay-to-destination links are non-orthogonal.

In an implementation, the reliability testing consists in comparing an estimate of a probability error concerning a message's LLR vector of soft values with a threshold value.

By way of example, the threshold value is 0.01. This threshold may be set as a function of propagation conditions. It may have an initial value that is determined using simulations or measurements.

In an implementation, the probability of error is estimated over all of the soft values associated with the message. This implementation is suitable for the sources performing coding that is not systematic.

In an implementation, the code words received by the relay are transmitted after systematic coding by the sources, and the probability of error is estimated solely on the soft values associated with a systematic portion of the message.

This implementation is suitable for the sources performing coding that is systematic. By limiting the estimation of the probability of error to the systematic portion, the relay becomes more effective.

In an implementation, the shaping further comprises binary network coding and channel coding, the binary network coding consisting in using an exclusive-OR in the binary field to add together the messages estimated without error and then interleaved.

Such coding is adapted to messages that are estimated without error by the relay. The hard value of a message estimated without error is obtained by setting the negative soft values of its LLR vector to zero and the positive soft values to one.

In an implementation, if no message is detected without error, and if at least one message detected with error is reliable, then the modulation is of the soft type.

The modulation that is performed in soft form (also known as soft "mapping") determines a complex value that is not one point of the constellation but rather a weighted mean value of the points of the constellation conditioned to the consecutive LLRs relating to the bits constituting the message, where this technique is known as minimum mean square uncorrelated error (MMSUE) compression.

In an implementation, the soft type modulation maps Q>2 soft values of bits constituting the reliable message onto a complex symbol that is a weighted mean value of the points of the constellation conditioned to the value of the Q soft values.

The modulation consists in mapping Q soft values of the message on a complex symbol determined as the weighted mean of the symbols of the constellation conditioned to the Q LLRs of the Q bits constituting the message.

In an implementation, the channel interleaving is performed solely on a selection of soft values in order to adjust the coding and modulation rate to the length of the second given number of channel uses.

In an implementation, if no message is detected without error, and if all of the messages detected with error are reliable, then the shaping in soft form comprises soft network coding the soft values before the channel interleaving and comprises soft modulation.

In an implementation, the soft network coding is addition performed solely on a selection of the soft values in order to adjust the coding and modulation rate to the length of the second given number of channel uses.

In an implementation, if at least one message is detected without error, and if at least one message is detected with error and is reliable, then soft values positioned at extreme quantification values corresponding to the values zero and one are associated with the messages detected without error, and the shaping in soft form comprises soft network coding of the soft values of the messages prior to channel interleaving, and comprises soft modulation.

The invention also provides a relay for a telecommunications system having M sources, L relays, and D destinations, and designed to perform a relaying method of the invention. The relay comprises:

- a soft decoder of code words transmitted by at least one source during a given first number of the channel uses in order to obtain vectors of soft values representing the decoded messages;
- an error detector for detecting errors in the vectors in order to separate messages estimated without error from messages estimated with error;
- reliability testing means relating solely to the vectors of messages estimated with error in order to be able to separate messages that are reliable from messages that are not reliable;
- a shaper unit comprising:
  - a channel interleaver and a modulator taking account only of the messages estimated without error and of those messages estimated with error that are reliable, this shaping being performed in soft form if at least one message estimated with error successfully passes the reliability testing; and
- a transmitter for transmitting during a second given number of channel uses a signal representative of the messages taken into account by the shaper unit.

In an embodiment, the shaper unit further comprises:
- interleavers for respectively interleaving the messages estimated without error; and
- a network coder in a Galois field for the interleaved messages followed by an interleaver and by a channel coder.

In an embodiment, the modulator is of soft type and the shaper unit further comprises, before the channel interleaver:
- means for selecting some of the soft values of the messages that are estimated with error and that are reliable; and
- a network coder for soft coding the selected soft values.

In an embodiment, the modulator is of soft type and the shaper unit further comprises, before the channel interleaver:
- means for selecting some of the soft values of the messages that are estimated with error and that are reliable;
- an interleaver for interleaving the selected soft values;
- a network coder for soft coding the selected soft values;
- a network interleaver; and
- a soft channel coder.

The invention also provides a system having M sources, L relays, and D destinations in which the relays are relays of the invention. In a particular embodiment of the system, the network interleavers differ between the relays.

The invention is particularly suitable for half-duplex relays, but it can equally well be used with full-duplex relays. Cooperative systems making use of half-duplex relays are very attractive because they use communication schemes that are simpler than schemes for full-duplex relays, that are easy to implement, and that are of reduced cost.

The various above implementation embodiments may be optionally combined with one or more of these implementation embodiments in order to define others.

In a preferred implementation, the steps of the relaying method are determined by instructions of a relaying program incorporated in one or more electronic circuits such as chips, which themselves may be arranged in electronic devices of the relay. The relaying method of the invention may equally well be performed when the program is loaded into a calculation member such as a processor or the equivalent with its operation then being controlled by executing the program.

Consequently, the invention also applies to a computer program, in particular a computer program on or in a data medium, and suitable for performing the invention. The program may use any programming language, and it may be in the form of source code, object code, or code intermediate between source code and object code, such as in a partially compiled form, or in any other desirable form for implementing a method of the invention.

The data medium may be any entity or device capable of storing the program. For example, the medium may comprise storage means such as a read only memory (ROM), for example a compact disk (CD) ROM or a microelectronic circuit ROM, or indeed magnetic recording means, e.g. a hard disk, or a universal serial bus (USB).

Alternatively, the data medium may be an integrated circuit in which the program is incorporated, the circuit being adapted to execute or to be used in the execution of the method in question.

Furthermore, the program may be converted into a transmissible form such as an electrical or optical signal that can be conveyed via an electrical or optical cable, by radio, or by other means. The program of the invention may in particular be downloaded from a network of the Internet type.

The invention also provides a computer program on a data medium, said program including program instructions adapted to performing a relaying method of the invention, when said program is loaded in and executed by a relay for a system having M sources, L relays, and D destinations, the relay being for performing the relaying method.

The invention also provides a data medium including program instructions adapted to performing a relaying method of the invention, when said program is loaded in and executed by a relay for a system having M sources, L relays, and D destinations, the relay being for performing the relaying method.

LIST OF FIGURES

Other characteristics and advantages of the invention appear more clearly on reading the following description of implementations given merely as illustrative and nonlimiting examples, and from the accompanying drawings, in which.

DETAILED DESCRIPTION OF PARTICULAR EMBODIMENTS

The following notation is used in the application.

All of the vectors make use of bold characters. A vector v has its k-th element written $v_k$. $F_q$ is the q-element Galois field, $\mathbb{R}$ is the real number field and $\mathbb{C}$ is the complex number field.

Relaying of the invention is used in wireless systems in which at least two independent messages are transmitted via at least one relay on the way to their destinations. In general manner, the sources, nodes $s_i$, $i \in \{1, \ldots, M\}$, broadcast their coded information sequences for the attention of relays $r_j$, $j \in \{1, \ldots, L\}$ and of destinations $d_k$, $k \in \{1, \ldots, D\}$. Each relay decodes the signals received from the sources and jointly re-encodes the messages that result from the decoding, while adding their own redundancy so as to create a network code.

For example, the invention may be used in so-called two-way multiple relay channel (TWMRC) systems, in so-called multiple access multiple relay channel (MAMRC) systems, or in so-called broadcast multiple relay channel (BMRC) systems.

Figure 1:
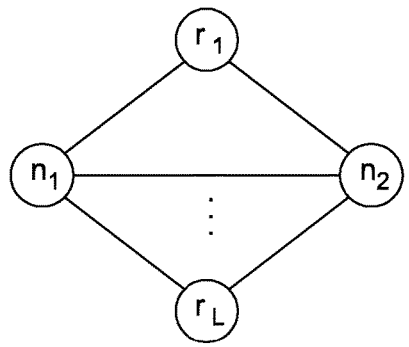
FIG. 1 is a diagram of a two-way multiple relay channel (TWMRC) of the prior art.

TWMRC systems as shown in FIG. 1 comprise two nodes $s_1$, $s_2$ seeking to transmit messages to each other while using L relays, L≥1. In general, there exists a direct link between the two nodes. The relays are used to increase the reliability of communication between the two nodes. Nevertheless, if the two nodes are half-duplex nodes and if they transmit simultaneously, then they cannot listen to each other. Under such circumstances, there is no direct link between the two nodes $s_1$, $s_2$. Whatever the circumstances, the relays may be in accordance with the invention and used effectively.

Figure 2:
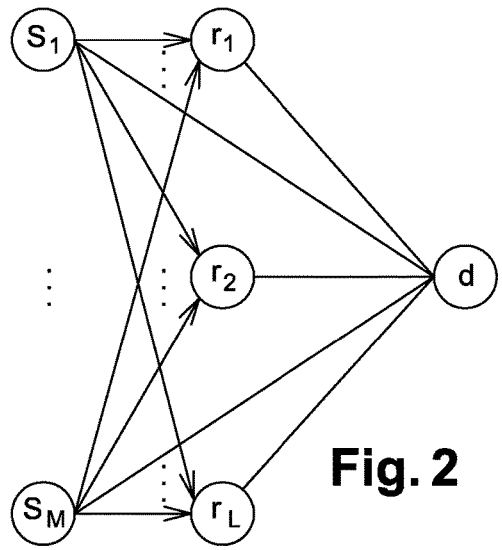
FIG. 2 is a diagram of a multiple access multiple relay channel (MAMRC) of the prior art.

MAMRC systems as shown in FIG. 2 comprise M sources $s_1, \ldots, s_M$ seeking to transmit their messages to a common destination d using the relays $r_1, \ldots, r_L$. The channel model may be of the orthogonal, semi-orthogonal, or non-orthogonal type. The relays in accordance with the invention may be used to increase the reliability of transmission regardless of the type of the channel.

Figure 3:
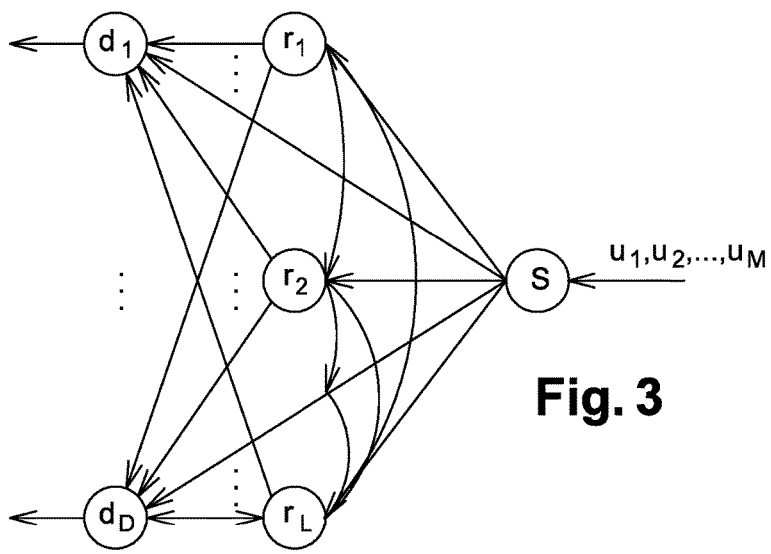
FIG. 3 is a diagram of a broadcast multiple relay channel (BMRC) of the prior art.

BMRC systems as shown in FIG. 3 comprise a source s seeking to transmit M≥2 different messages to D≤M different destinations using a so-called "round robin" mode (one message is transmitted in each timeslot) using L≥1 relays. The relays in accordance with the invention are used to increase the reliability of transmission. Each relay may have its own timeslot (orthogonal system), or all of the relays may transmit simultaneously (non-orthogonal system). The principle of network coding is close to that of a hybrid automatic repeat request (HARQ) mode: the n-th message may be network coded at the relay with the preceding messages.

The invention is described below in detail using the example of a TWMRC network. The two nodes $s_1$, $s_2$ seek to exchange their K-bit messages $u_1, u_2 \in \mathbb{F}_2^K$, each using L relays $r \in \{r_1, \ldots, r_L\}$. In this example, the relays are half-duplex relays (they cannot receive and transmit simultaneously).

In order to simplify the description, the system taken into consideration is semi-orthogonal: the transmissions from the nodes $s_1$ and $s_2$ do not interfere at the relays (orthogonal in time) but the transmissions from the relays are simultaneous on the same band and thus interfere at the nodes $s_1$ and $s_2$. The term "semi-orthogonal" is used herein with reference to the non-orthogonal system, which would have taken into consideration simultaneous transmission from the nodes $s_1$ and $s_2$ on the same band.

Figure 4:
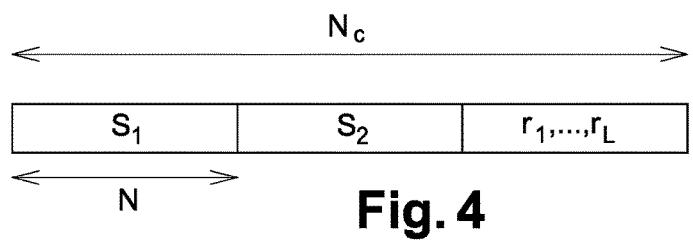
FIG. 4 shows a semi-orthogonal protocol as taken into consideration in the detailed description of the invention.

This semi-orthogonal protocol is shown in FIG. 4. During the first timeslot, the node $s_1$ transmits, while the relays and the node $s_2$ listen. During the second timeslot, the node $s_2$ transmits, while the relays and the node $s_1$ listen. During the third timeslot, the relays transmit simultaneously, while the node $s_1$ and the node $s_2$ listen. Each transmission cycle is made up of $N_c$ uses of the channel, equally subdivided into three transmission timeslots. One channel use is the smallest granularity in the time-frequency resource as defined by the system that enables a modulated symbol to be transmitted. The number of channels uses is associated with the available frequency band and with the duration of transmission.

In order to simplify the description, the following assumptions are made:

only one relay is used, L=1, with the nodes and the relay being synchronized and each being provided with a single transmit antenna;

the messages from the nodes are independent (there is no correlation between them);

the links between the nodes suffer noise (additive noise) and fading (fading gain, which may be fast or slow). The description relates more particularly to slow fading, in which fading gains are constant during the Nc uses of the channel, where Nc is the number of uses of the channel for accomplishing one transmission cycle; and all of the timeslots allocated to the various nodes are of the same size in terms of number of channels uses, Nc=3N. Each transmission timeslot contains N channels uses.

When in the presence of only one relay, the semi-orthogonal system under consideration becomes an orthogonal variant. The messages are transmitted by the nodes, which are typically user terminals seeking to reach the same base station while making use of a relay.

Figure 5:
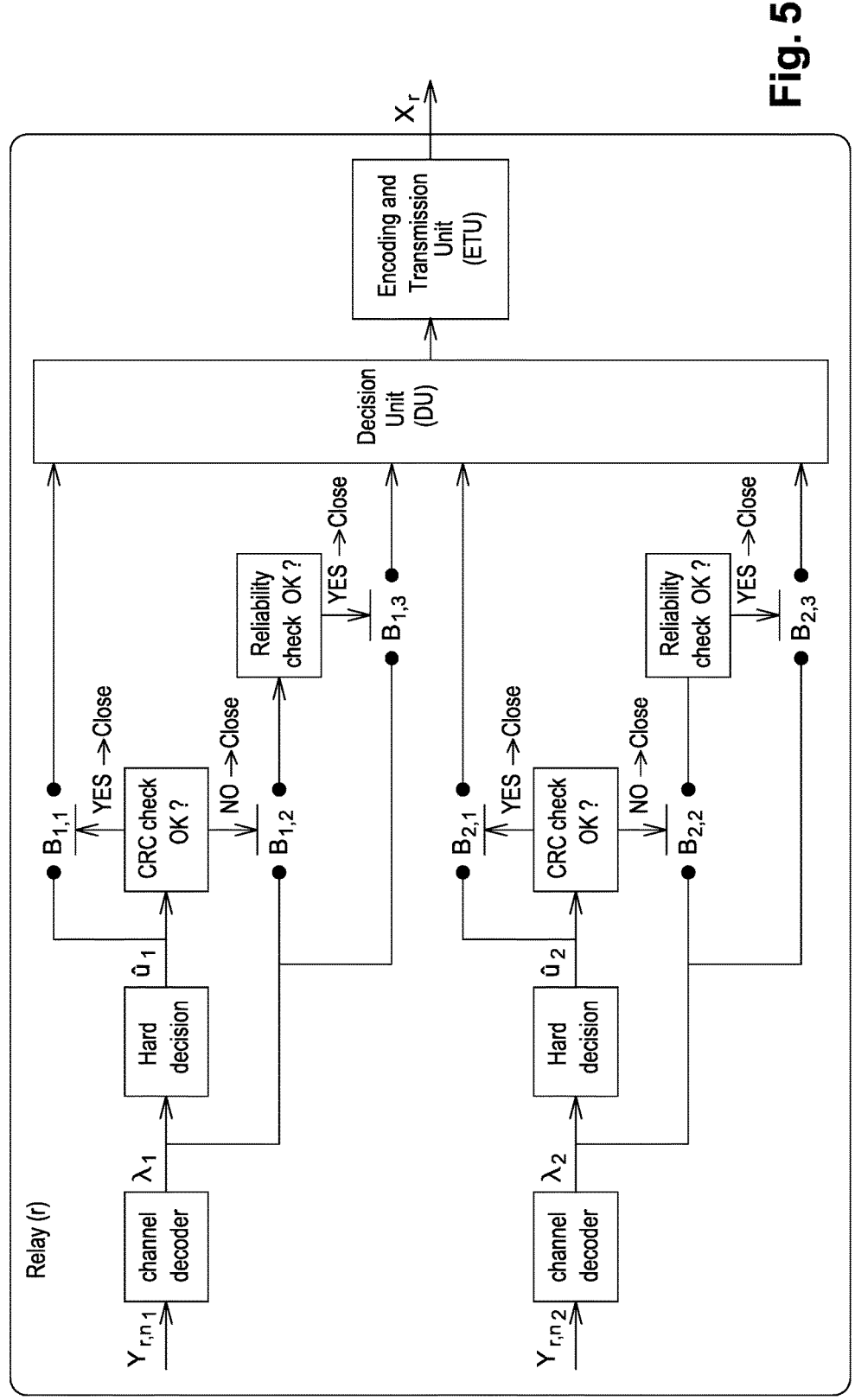
FIG. 5 is a diagram of an embodiment of a relay r of the invention.
Figure 6:
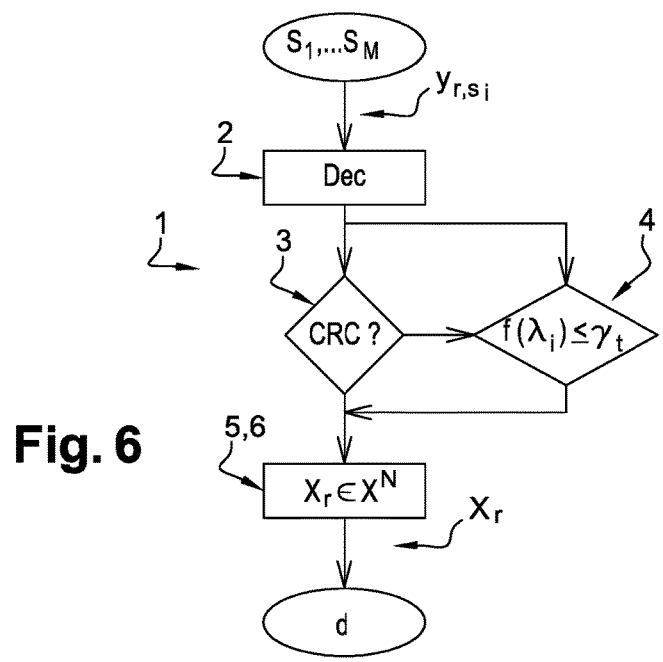
FIG. 6 is a simplified flowchart of a relay method of the invention.

A relay r of the invention is described with reference to an embodiment shown in FIG. 5. The method 1 of the invention is shown in FIG. 6.

The data message from the source $s_i$ is written $u_i \in \mathbb{F}_2^K$ $i \in \{1, 2\}$, it is a message of length K made up of components taking their values in the finite Galois field $\mathbb{F}_2^K$ of integer 2 order. $u_i$ is considered as including a cyclic redundancy check (CRC) that serves to verify the integrity of the message. The message $u_i$ is converted by a channel code into a $P_s$ bits code word written $c_i \in \mathbb{F}_2^{P_s}$. The sources may use any channel coding. Without loss of generality, it is considered that the channel coding used by a source is systematic, i.e. the code word $c_i$ includes in its first portion the message, and it is assumed that the same coding length $P_s$ is used among the sources. The code word $c_i$ is interleaved, with the interleavers differing among the nodes and being written $\pi_i$. The interleaved code word $b_i$ feeds a memoryless modulator in order to obtain a complex code word $x_i \in \chi^N$ such that $\chi \subset \mathbb{C}$ denotes a complex constellation of cardinality $|\chi|=2^q$. It should be observed that the symbols as obtained in this way are subsequently associated with a channel use by taking account of the transmission power available to the relay (multiplexing portion, IFFT, demultiplexing, inserting the cyclic prefix, filtering, and radiofrequency portion when using OFDM).

The relay r of the invention receives the following, in baseband, during the timeslot allocated to the node $s_i$, $i \in \{1, 2\}$:

$$y_{r,s_i} = h_{r,s_i} x_{s_i} + w_{r,s_i} \quad (1)$$

or $$y_{r,s_i,n} = h_{r,s_i} x_{s_i,n} + w_{r,s_i,n} \forall n=1, \ldots, N \quad (2)$$

in which expressions $h_{r,s_i} \in \mathbb{C}$ represents the channel gain between the node $s_i$ and the relay r, and $w_{r,s_i} \in \mathbb{C}^N$ is an additive noise vector.

The relay r performs detection 1 on the received signal $y_{r,s_i}$. When the sources transmit while using the same channel uses (a non-orthogonal system), detection is performed jointly to separate the messages from the respective sources by using a multi-user joint detector (MUD), which may optionally be iterative.

The relay r uses a soft channel decoder dec to decode 2 each of the messages at the end of the timeslot allocated to a source. For each code word, the channel decoder generates a vector of soft values or LLR written $\lambda_i \in \mathbb{R}^P$ representing the decoded message.

The relay r performs error detection 3 of the vectors $\lambda_1$, $\lambda_2$ in order to be able to separate the messages that are estimated without error from the messages that are estimated with error.

In an embodiment, this error detection is performed after taking a hard decision on the values of the bits. When the channel coding at the source is of systematic type, the first portion of the code word generally includes the systematic portion. This first portion is used to take a hard decision about the values of the bits (0 or 1) of the message in order to obtain an estimated message $\hat{u}_i$, in a hard form:

$$\hat{u}_{i,l} = \begin{cases} 1 & \text{if } |\lambda_{i,l}| > 0 \\ 0 & \text{if } |\lambda_{i,l}| \leq 0 \end{cases} \forall l = 1, \ldots, K \quad (3)$$

This implementation is particularly simple to perform, and more particularly when the message from the source includes integrity information such as a CRC. Error detection consists in verifying the integrity of each message by comparing the value of the CRC with the content of the message after the hard decision.

Messages that are estimated without error are considered to be such that $\hat{u}_i = u_i$. These messages are transmitted to a decision unit DU, and in the relay illustrated in FIG. 5, the switch $B_{i,1}$ is closed.

The messages estimated with error are such that $\hat{u}_i \neq u_i$, and they are not transmitted to the decision unit DU. In the relay illustrated in FIG. 5, the switch $B_{i,1}$ remains open and the switch $B_{i,2}$ is closed.

These messages that are estimated with error are subjected to a reliability test 4 while they are in their form prior to error detection, i.e. in their soft form; the test is thus applied to the LLR vectors $\lambda_i$. This test serves to separate messages that are reliable from messages that are not reliable. This reliability test uses a reliability function $f$ applied to the LLR vector. The resulting value is compared with a threshold $\gamma_t \in \mathbb{R}$.

In a first implementation, the function $f$ estimates the error bit probability of the code word $c_i$:

$$f: \mathbb{R}^{P_s} \to \mathbb{R}: f(\lambda_i) = \frac{1}{P_s} \sum_{l=1}^{P_s} \frac{1}{1+\exp(|\lambda_{i,l}|)} \quad (4)$$

In a second implementation, the function $f$ estimates the error bit probability of the code word $c_i$ over a first portion corresponding to a systematic portion:

$$f: \mathbb{R}^K \to \mathbb{R}: f(L_i) = \frac{1}{K} \sum_{l=1}^{K} \frac{1}{1+\exp(|\lambda_{i,l}|)} \quad (5)$$

$$L_{i,l} = \lambda_{i,l} \forall l \in \{1, \ldots, K\}$$

Depending on the implementation, the greater K or $P_s$, the greater the accuracy of the test.

If the value is less than or equal to the threshold: $f(\lambda_i) \leq \gamma_t$ or $f(L_i) \leq \gamma_t$, the message is reliable. In the relay illustrated in FIG. 5, the switch $B_{i,3}$ is closed and the message is transmitted to the decision unit DU.

If the value is greater than a threshold: $f(\lambda_i) > \gamma_t$ or $f(L_i) > \gamma_t$, the message is not reliable. In the relay illustrated in FIG. 5, the switch $B_{i,3}$ is opened and the message is not transmitted to the decision unit DU.

On the basis of simulations, the initial value for the threshold may be set at about 0.01. This threshold is an adjustable parameter. In particular, it is a function of the relay and of the environmental conditions in which the relay is deployed.

The decision unit DU controls the operation of the encoding and transmission unit ETU as a function of the results of the integrity and reliability tests.

The ETU performs shaping 5 taking account only of the messages that have been estimated without error and of the messages that have been estimated with error and that are reliable. This shaping is performed in a soft form if at least one message estimated with error successfully passes the reliability test. This shaping comprises channel interleaving and modulation $x_r \in \chi^N$.

The ETU transmits 6 a signal representative of the messages after they have been shaped. Using mechanisms known to the person skilled in the art, the relay makes use of a signaling signal to inform the destination about the messages taken into account in the representative signal.

The role of the decision unit DU and its impact on the operation of the ETU are described in detail below.

If no message is received without error and if no received message is reliable, then the relay remains silent, which avoids propagating errors, and the ETU is not activated by the decision unit DU.

If all the messages are received without error (so there is no message for the reliability test), then the ETU is activated in a hard mode by the decision unit DU.

If at least one message is without error and if all the messages estimated with error are not reliable, then the ETU is activated in a hard mode by the decision unit.

Activating the ETU in a hard mode means that the messages are taken into account by the ETU in their hard form; the shaping 5 is applied to the bits of the messages. For the example shown in FIG. 5, the shaping performed by the ETU in a hard mode may be expressed in the following form:

$x_r \Theta_{hard,i}(u_i)$ if the only message $\hat{u}_i$, i=1 or 2 is without error, and $\hat{u}_j$ with j≠i is not reliable (and estimated with error) or $x_r = \Theta_{hard,3}(u_1, u_2)$ if both messages are without error.

Figure 7:
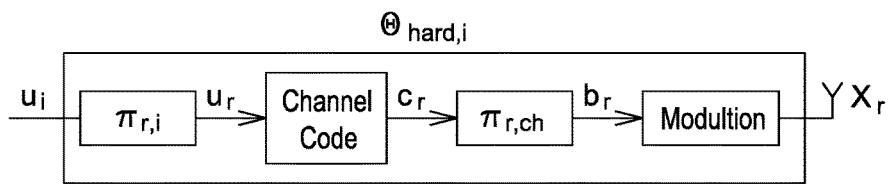
FIG. 7 shows an implementation of the $\Theta_{hard,i}(u_i)$ shaping performed by the encoding and transmission unit (ETU)

FIG. 7 shows an implementation of the shaping $\Theta_{hard,i}(u_i)$. This shaping comprises a message interleaver $\pi_{r,i}$, a channel coder, a channel interleaver $\pi_{r,ch}$, and a modulator. The message interleaver interleaves the message $u_i = \hat{u}_i$ and gives an interleaved message $u_r$. The channel coder generates the code word $c_r$. The channel interleaver interleaves the code word in order to generate an interleaved code word $b_r$. The modulator generates the modulated signal $x_r \in \chi^N$ from the interleaved word $b_r$.

Figure 8:
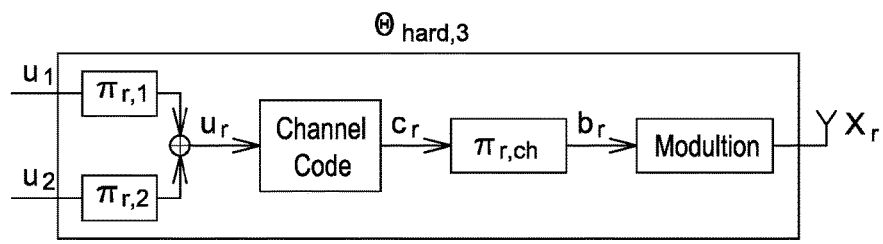
FIG. 8 shows an implementation of the $\Theta_{hard,3}(u_1,u_2)$ shaping performed by the ETU.

FIG. 8 shows an implementation of the shaping $\Theta_{hard,3}(u_1, u_2)$. This shaping comprises two distinct message interleavers $\pi_{r,1}, \pi_{r,2}$, a channel coder, a channel interleaver $\pi_{r,ch}$, and a modulator. The message interleavers $\pi_{r,1}, \pi_{r,2}$ interleave the bits of the messages without error. The interleaved messages $\tilde{u}_i$ are added together by using an exclusive-OR (XOR) in the binary field in order to generate the message $u_r$:

$$u_{r,k} = \tilde{u}_{1,k} \oplus \tilde{u}_{2,k} \forall k=1, \ldots, K \quad (6)$$

The channel coder codes the message $u_r$ in order to give the code word $c_r \in F_2^{P_r}$. The code word $c_r$ is interleaved by the channel interleaver in order to give the interleaved word $b_r$. The modulator generates the modulated signal $x_r \in \chi^N$ from the interleaved word $b_r$.

If at least one message is received with error and is reliable, then the ETU is activated in a soft mode by the decision unit DU. Under such circumstances, the shaping performed by the ETU is one of the following:

$x_r = \Theta_{soft,i}(\lambda_1)$ if $\hat{u}_i$ (as estimated with error) is reliable and if $\hat{u}_j$ with j≠i is neither without error nor reliable;

$x_r = \Theta_{soft,3}(\lambda_1, \lambda_2)$ either if both messages $\hat{u}_1$ and $\hat{u}_2$ (as estimated with error) are reliable, or one message (as estimated with error) is reliable and the other is without error.

It should be observed that under such circumstances, during hard decision-taking the soft values (LLR) of the messages without error are positioned on extreme quantification values corresponding to the values zero and one.

Figure 9:
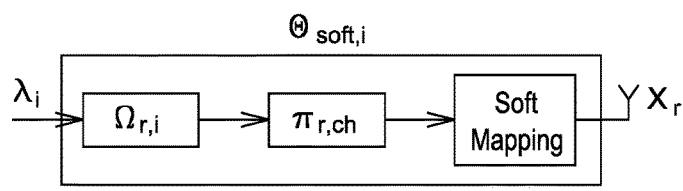
FIG. 9 shows an implementation of the $\Theta_{soft,i}(\lambda_1)$ shaping performed by the ETU.

FIG. 9 shows an implementation of the shaping $\Theta_{soft,i}(\lambda_1)$. This shaping comprises a puncturing device $\Omega_{r,i}$, a channel interleaver $\pi_{r,ch}$, and a soft modulator. The puncturing device selects some of the soft values ($P_s'$) of the LLR vector $\lambda_i$ corresponding to the message $u_i$ and gives a punctured vector $L_i$. The interleaver interleaves the punctured vector in order to generate an interleaved punctured vector. The soft modulator converts the interleaved punctured vector into a modulated signal $x_r \in \chi^N$.

Figure 10:
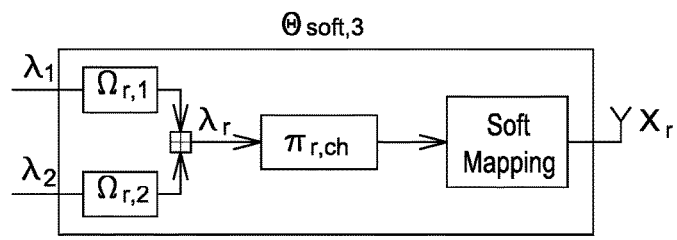
FIG. 10 shows an implementation of the $\Theta_{soft,3}(\lambda_1,\lambda_2)$ shaping performed by the ETU.

FIG. 10 shows an implementation of the shaping $\Theta_{soft,3}(\lambda_1, \lambda_2)$. This shaping comprises two puncturing devices $\Omega_{r,1}, \Omega_{r,2}$, a soft network coder, a channel interleaver $\pi_{r,ch}$, and a soft modulator. Each puncturing device $\Omega_{r,1}, \Omega_{r,2}$ selects some of the soft values ($P_s'$) of the LLR vectors $\lambda_1$, $\lambda_2$ corresponding to the messages $u_1, u_2$ and gives punctured vectors $L_1, L_2$. The soft network coder adds together the punctured vectors (of the same length adapted as a function of the number of channel uses allocated to the relay) by performing the following operation:

$$\lambda_{r,l} = L_{1,l} \boxplus L_{2,l} = \log \frac{e^{L_{1,l}} + e^{L_{2,l}}}{1 + e^{L_{1,l}+L_{2,l}}} \forall l=1, \ldots, P_s' \quad (7)$$

The channel interleaver interleaves the coded vector $\lambda_r$ to generate an interleaved coded vector. The soft modulator converts the interleaved coded vector into a modulated signal $x_r \in \chi^N$.

Figure 11:
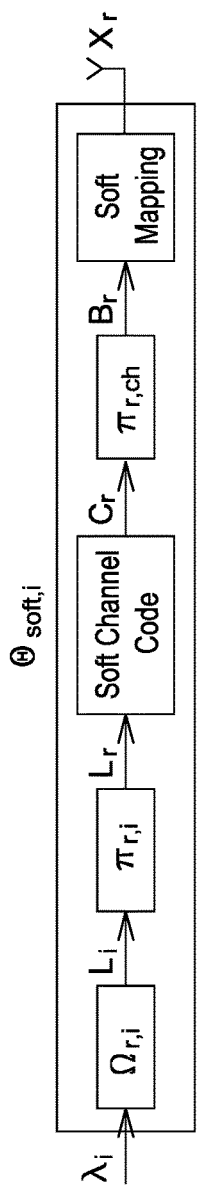
FIG. 11 shows another implementation of the $\Theta_{soft,i}(\lambda_1)$ shaping performed by the ETU.
Figure 12:
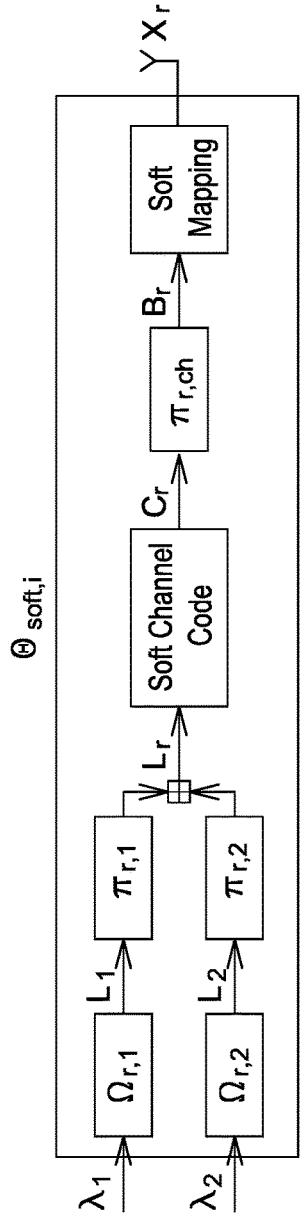
FIG. 12 shows another implementation of the $\Theta_{soft,3}(\lambda_1, \lambda_2)$ shaping performed by the ETU.

FIGS. 11 to 12 show other examples of shaping $\Theta_{soft,i}(\lambda_1)$ and $\Theta_{soft,3}(\lambda_1, \lambda_2)$. These examples of shaping are advantageously soft for coding at the relay, i.e. the shaping makes it possible to use channel coding that is different from the channel coding used by the sources.

The shaping example $\Theta_{soft,i}(\lambda_1)$ shown in FIG. 11 comprises in addition to the components of the shaping shown in FIG. 9, a message interleaver $\pi_{r,i}$, and a soft channel coder. The puncturing device selects K soft values of the LLR vector $\lambda_i$ corresponding to the message $u_i$, e.g. the K values corresponding to the systematic portion, in order to give a punctured vector $L_i \in \mathbb{R}^K$. The message interleaver $\pi_{r,i}$ interleaves the punctured vector $L_i$ in order to generate an interleaved punctured vector $L_r$. The soft channel coder codes the interleaved punctured vector $L_r$ in the form $C_r \in \mathbb{R}^{P_r}$. The channel interleaver $\pi_{r,ch}$ interleaves the coded vector $C_r$ to generate an interleaved coded vector $B_r$. The soft modulator converts the interleaved coded vector into a modulated signal $x_r \in \chi^N$.

The shaping example $\Theta_{soft,3}(\lambda_1, \lambda_2)$ shown in FIG. 12 comprises, in addition to the components of the shaping shown in FIG. 10, two distinct message interleavers $\pi_{r,1}, \pi_{r,2}$ and a soft channel coder. Each puncturing device $\Omega_{r,1}, \Omega_{r,2}$ selects K soft values of the LLR vector $\lambda_1, \lambda_2$ corresponding to the message $u_1, u_2$, e.g. the K values corresponding to the systematic portion, in order to give punctured vector $L_1 \in \mathbb{R}^K, L_2 \in \mathbb{R}^K$. Each message interleaver $\pi_{r,1}, \pi_{r,2}$ interleaves the corresponding punctured vector $L_1, L_2$ to generate an interleaved punctured vector. The soft network coder adds together the interleaved punctured vectors using operation (1) to generate a vector $L_r \in \mathbb{R}^K$. The soft channel coder codes the vector $L_r$ in the form $C_r \in \mathbb{R}^{P_r}$. The channel interleaver interleaves the coded vector $C_r$ to generate an interleaved coded vector $B_r$. The soft modulator converts the interleaved coded vector into a modulated signal $x_r \in \chi^N$.

When the embodiment of the relay makes it necessary to use LLRs on the nonsystematic bits of the messages from the sources, this embodiment can be improved when one of the messages is without error. The method regenerates the LLR vector from the bits of the message. Thus, for example, if $u_1 = \hat{u}_1$, then the relay can regenerate the code word $c_1$ given that it knows the channel coding used by the source $s_1$. Knowing the code word $c_1$, the method regenerates the LLR vector as follows:

$$\lambda_{1,l} = \begin{cases} -\infty & \text{if } c_{1,l} = 0 \\ \infty & \text{if } c_{1,l} = 1 \end{cases} \forall l=1, \ldots, P_s \quad (8)$$

The principle of the soft modulation is explained below.

Conventional modulation $\phi(b_{r,l_1}, \ldots, b_{r,l_Q})=x_{r,n}^{hard}$ causes Q consecutive bits having the value 0 or 1 (written herein as $b_{r,l_1}, \ldots, b_{r,l_Q}$) to correspond to the symbol $x_{r,n}^{hard}$ belonging to the constellation $\chi$ ($x_{r,n}^{hard} \in \chi$). This operation corresponds to the "modulation" boxes in FIGS. 7, 8, and 13. It is assumed that the power of the constellation is normalized to one. The associated soft modulation corresponds to the "soft mapping" boxes of FIGS. 9, 10, 11, 12, 14, and 15. Using the notation associated with FIGS. 11, 12, and 15, soft modulation consists in taking Q consecutive LLRs $B_{r,l_1}, \ldots, B_{r,l_Q}$ relating to the values of the bits $b_{r,l_1}, \ldots, b_{r,l_Q}$ of the symbol $x_{r,n}^{hard}$ and in finding the function $f(B_{r,l_1}, \ldots, B_{r,l_Q})$ that minimizes the mean square error:

$$\sigma_1^2 = \min_f \mathbb{E}|f(B_{r,l_1}, \ldots, B_{r,l_Q}) - x_{r,n}^{hard}|^2 \qquad (9)$$

where $\sigma_1^2$ is the minimum mean square error (MMSE). This well-known estimation problem gives:

$$f(B_{r,l_1}, \ldots, B_{r,l_Q}) = \mathbb{E}\{x_{r,n} \mid B_{r,l_1}, \ldots, B_{r,l_Q}\} = \qquad (10)$$

$$\sum_{(b_{r,l_1}, \ldots, b_{r,l_Q}) \in \mathbb{F}_2^Q} \phi(b_{r,l_1}, \ldots, b_{r,l_Q}) \prod_{i=1}^{Q} \frac{e^{b_{r,l_i} B_{r,l_i}}}{(1 + e^{b_{r,l_i} B_{r,l_i}})} = \tilde{x}_{r,n}$$

The resulting complex value $\tilde{x}_{r,n}$ is the weighted mean of the symbols of the constellation conditioned to the LLRs of their constituent bits. When the constellation carries less than two bits (i.e. Q≤2), an alternative consists in transmitting the LLRs directly (after power normalization) on the in-phase component and on the quadrature component. When Q>2, the soft modulation proposed above (MMSE) enables the Q LLRs to be transmitted during a single use of the channel: the LLRs are compressed by the soft modulation.

Thus, during the n-th channel use associated with its transmission timeslot (containing N channel uses n=1, ..., N), the relay transmits:

$$x_{r,n} = \frac{1}{\tilde{\sigma}} \tilde{x}_{r,n} \qquad (11)$$

in order for the power of each of the $x_{r,n}$ to remain equal to 1.

On reception, the destination $s_i$ receives $$y_{s_i,r,n} = h_{s_i,r} x_{r,n} + w_{s_i,r,n} \forall n=1, \ldots, N \qquad (12)$$

By construction, it follows that:

$$\tilde{x}_{r,n} = x_{r,n}^{hard} + w_1 \qquad (13)$$

where the estimation noise $w_1$ has variance $\sigma_1^2 = 1 - \tilde{\sigma}^2$ with:

$$\tilde{\sigma}^2 = \frac{1}{N} \sum_{n=1}^{N} |\tilde{x}_{r,n}|^2 \quad (\tilde{\sigma}^2 \leq 1) \qquad (14)$$

and is correlated with $x_{r,n}$ (biased MMSE estimator). The uncorrelated model corresponding to the minimum mean square uncorrelated error (MMSUE) is written:

$$\tilde{x}_{r,n} = \tilde{\sigma}^2 x_{r,n}^{hard} + w_2 \qquad (15)$$

where $w_2$ is not correlated with $x_{r,n}$ and has variance $\tilde{\sigma}^2(1-\tilde{\sigma}^2)$. Finally, the signal received in baseband can be written:

$$y_{s_i,r,n} = h_{s_i,r} x_{r,n} + w_{s_i,r,n} = \qquad (16)$$

$$h_{s_i,r} \tilde{\sigma} x_{r,n}^{hard} + h_{s_i,r} \frac{w_2}{\tilde{\sigma}} + w_{s_i,r,n} = h_{s_i,r} \tilde{\sigma} x_{r,n}^{hard} + w'_{s_i,r,n}$$

where the variance of $w'_{s_i,r,n}$ can be written:

$$|h_{s_i,r}|^2 (1-\tilde{\sigma}^2) + \sigma^2 \qquad (17)$$

with $\sigma^2$ being the variance of the noise $w_{s_i,r,n}$.

It should be observed that when the bits $b_{r,l_1}, \ldots, b_{r,l_Q}$ are known (or in equivalent manner the LLRs $B_{r,l_1}, \ldots, B_{r,l_Q}$ take the values plus or minus infinity), it follows that $\tilde{\sigma}^2=1$, i.e. $\phi(b_{r,l_1}, \ldots, b_{r,l_Q})=x_{r,n}=x_{r,n}^{hard}$.

An alternative consists in quantifying $x_{r,n}$ on a determined number of bits. These bits are then transmitted by the relay using a conventional technique.

The destination needs to know the power $\tilde{\sigma}^2$. This information may be transmitted in a control signal between the relay and the destination. Alternatively, the destination may perform blind detection, providing it knows the state of the channel and the noise power on reception.

The system under consideration may comprise a plurality of relays, i.e. L≥2.

A first embodiment of a relay adapted to such a system consists in conserving the ETU as described above with the constraint that the message interleavers $\pi_{r,i}$ differ among the relays. When a relay receives more than two messages simultaneously, the network coder consists in an exclusive-OR (XOR) in hard or soft form of the messages selected by the decision unit DU.

A second embodiment of a relay adapted to such a system consists in optimizing the network coding in order to achieve full diversity. Under such circumstances, the main change in the structure of the relay compared with the above description consists in replacing the binary network coding (XOR) with network coding that is more suitable, and in adding a network interleaver $\pi_{r,net}$ between the network coding and channel coding. The suitable network coding must guarantee the full diversity criterion (e.g. network coding in a Galois field of order greater than two).

Figure 13:
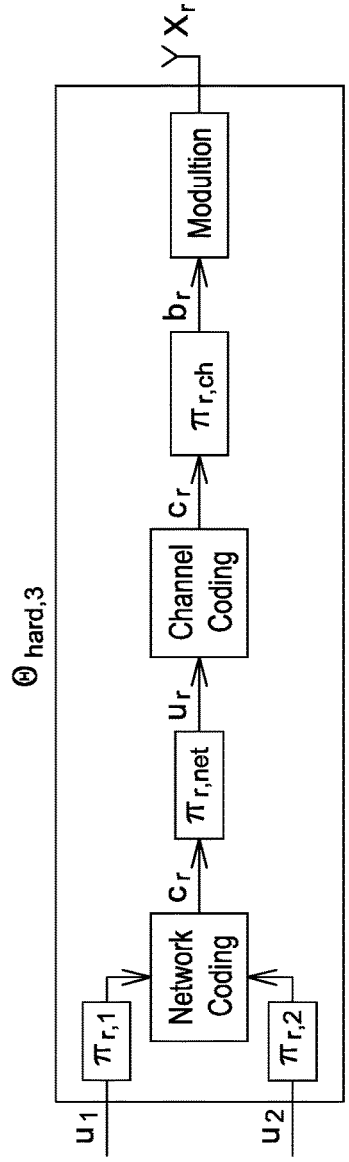
FIG. 13 shows an implementation of the $\Theta_{hard,3}(u_1,u_2)$ shaping performed by the ETU when the relay is used with other relays in the system, i.e. L≥2.

FIG. 13 shows an implementation of the $\Theta_{hard,3}(u_1,u_2)$ shaping performed by the ETU when L≥2. In comparison with the implementation shown in FIG. 8, the binary network coding (XOR) is replaced by network coding, and the shaping includes a network interleaver $\pi_{r,net}$ between the network coding and channel coding.

Figure 14:
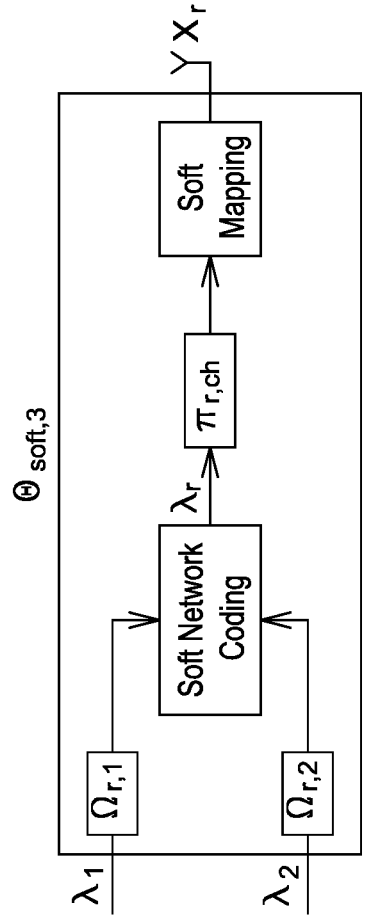
FIG. 14 shows a first implementation of the $\Theta_{soft,3}(\lambda_1,\lambda_2)$ shaping performed by the ETU when the relay is used with other relays in the system, i.e. L≥2.
Figure 15:
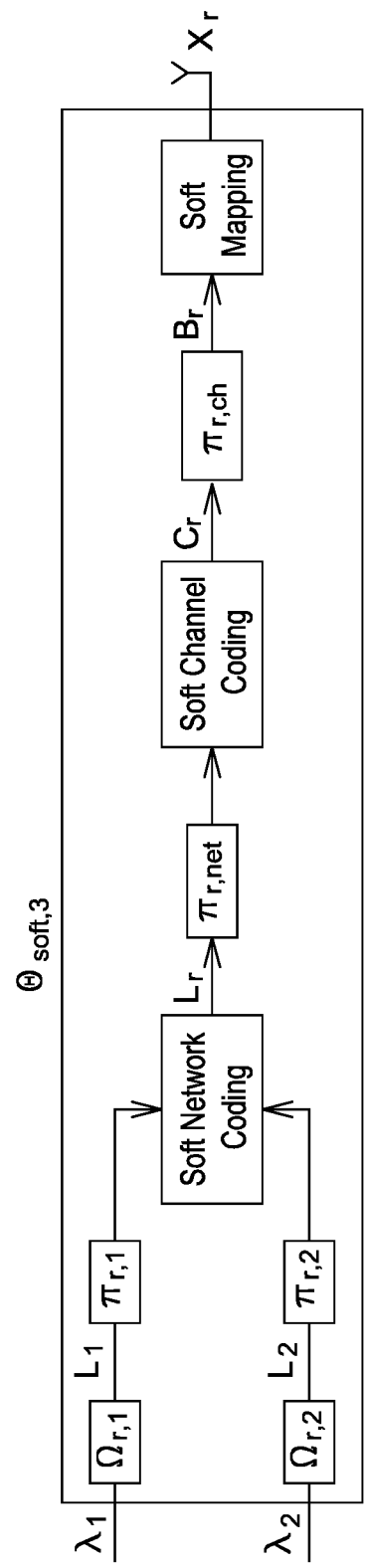
FIG. 15 shows a second implementation of the $\Theta_{soft,3}(\lambda_1, \lambda_2)$ shaping performed by the ETU when the relay is used with other relays in the system, i.e. L≥2.

FIGS. 14 and 15 show two implementations of the $\Theta_{soft,3}(\lambda_1,\lambda_2)$ shaping performed by the ETU when L≥2. The implementation of FIG. 14 is comparable to the implementation of FIG. 10. The implementation of FIG. 15 is comparable to the implementation of FIG. 12. In comparison with the implementation of FIG. 12, the implementation of FIG. 15 further comprises a network interleaver $\pi_{r,net}$ between the soft network coding and the soft channel coding.

APPENDIX

Algebraic Quantities
1. LLR:

The log likelihood ratio (LLR) represents the logarithm of the likelihood ratio or the ratio of probabilities relating to two symbols.

In the binary situation, a bit u may have a value of 1 or 0. Such a ratio is given by a scalar:

$$LLR = \log\left(\frac{P(u=1)}{P(u=0)}\right)$$

and uniquely defines the hard decision about the bit u by means of its sign.

2. LAPPR:

The log a posteriori probability ratio (LAPPR) designates a form of LLR that is "conditional" to parallel or "side" information that is typically provided by the received sequence.

In the binary situation, the LAPPR is defined by:

$$LAPPR = \log\left(\frac{P(u=1)\mid y}{P(u=0)\mid y}\right)$$

[1] patent application WO 2013/093359 "Method of transmitting a digital signal for a semi-orthogonal MS-MARC system, and corresponding program product and relay device".

[2] patent application WO 2013/093361 "Method of transmitting a digital signal for a non-orthogonal MS-MARC system, and corresponding program product and relay device".

The invention claimed is:

1. A relaying method:
relaying messages by a relay in a telecommunications system having M sources, L relays, and D destinations, M≥1, L≥1, D≥1, the transmissions between the sources, the relays, and the destinations taking place via a transmission channel, wherein relaying comprises the following acts performed by the relay:
soft decoding code words transmitted by at least one source during a given first number of the channel uses in order to obtain vectors of soft values representing the decoded messages;
detecting errors in the vectors in order to be able to separate messages estimated without error from messages estimated with error;
reliability testing relating solely to the vectors of messages estimated with error in order to be able to separate messages that are reliable from messages that are not reliable;
shaping, comprising channel interleaving and modulation taking account only of the messages estimated without error and of those messages estimated with error that are reliable, this shaping being performed in soft form if at least one message estimated with error successfully passes the reliability testing; and
during a second given number of channel uses, transmitting a signal that is representative of the messages taken into account by the shaping.

2. The method according to claim 1, wherein the reliability testing comprises comparing an estimate of a probability error concerning the vector of soft values of a message with a threshold value.

3. The method according to claim 2, wherein the probability of error is estimated over all of the soft values of the vector.

4. The method according to claim 2, wherein the code words received by the relay are transmitted after systematic coding by the sources, and wherein the probability of error is estimated solely on the soft values associated with a systematic portion of the message.

5. The method according to claim 1, wherein the shaping further comprises binary network coding and channel coding, the binary network coding comprising using an exclusive-OR in the binary field to add together the messages estimated without error and then interleaved.

6. The method according to claim 1, wherein if no message is detected without error, and if at least one message detected with error is reliable, then the modulation is of the soft type.

7. The method according to claim 6, wherein the soft type modulation maps Q>2 soft values of bits constituting the reliable message onto a complex symbol that is a weighted mean value of the points of the constellation conditioned to the value of the Q soft values.

8. The method according to claim 6, wherein the channel interleaving is performed solely on a selection of soft values in order to adjust the coding and modulation rate to the length of the second given number of channel uses.

9. The method according to claim 1, wherein, if no message is detected without error, and if all of the messages detected with error are reliable, then the shaping in soft form comprises soft network coding the soft values before the channel interleaving and comprises soft modulation.

10. The method according to claim 9, wherein the soft network coding is addition performed solely on a selection of the soft values in order to adjust the coding and modulation rate to the length of the second given number of channel uses.

11. The method according to claim 1, wherein if at least one message is detected without error, and if at least one message is detected with error and is reliable, then soft values positioned at extreme quantification values corresponding to the values zero and one are associated with the messages detected without error, and the shaping in soft form comprises soft network coding of the soft values of the messages prior to channel interleaving, and comprises soft modulation.

12. A relay for a telecommunications system having M sources, L relays, and D destinations, M≥1, L≥1, D≥1, for performing a relaying method, the relay comprising:
an electronic circuit or processor configured according to instructions of a relaying program to perform acts comprising:
soft decoding code words transmitted by at least one source during a given first number of the channel uses in order to obtain vectors of soft values representing the decoded messages;
detecting errors in the vectors in order to separate messages estimated without error from messages estimated with error;
reliability testing relating solely to the vectors of messages estimated with error in order to be able to separate messages that are reliable from messages that are not reliable; and
shaping comprising:
channel interleaving and modulation taking account only of the messages estimated without error and of those messages estimated with error that are reliable, this shaping being performed in soft form if at least one message estimated with error successfully passes the reliability testing; and
a transmitter, which transmits during a second given number of channel uses a signal representative of the messages taken into account by the shaper unit.

13. A system having the M sources, the L relays, and the D destinations, M≥1, L≥1, D≥1, wherein the relays are according to claim 12 and are such that the network interleavers differ between the relays.

* * * * *

UNITED STATES PATENT AND TRADEMARK OFFICE
CERTIFICATE OF CORRECTION

PATENT NO. : 10,313,052 B2  
APPLICATION NO. : 15/527559  
DATED : June 4, 2019  
INVENTOR(S) : Raphaël Visoz, Abdulaziz Mohamad and Antoine Berthet It is certified that error appears in the above-identified patent and that said Letters Patent is hereby corrected as shown below:

In the Specification

Column 13, Line 49, Equation (12) should appear as follows:

$$y_{s_i,r,n} = h_{s_i,r} x_{r,n} + w_{s_i,r,n} \quad \forall n = 1,\ldots,N \tag{12}$$

Column 13, Line 65, Equation (15) should appear as follows:

$$\tilde{x}_{r,n} = \tilde{\sigma}^2 x_{r,n}^{hard} + w_2 \tag{15}$$

Signed and Sealed this  
Seventh Day of July, 2020

Andrei Iancu  
*Director of the United States Patent and Trademark Office*